United States Patent
Morishima

(10) Patent No.: US 11,086,085 B2
(45) Date of Patent: Aug. 10, 2021

(54) OPTICAL CONNECTOR FOR CONNECTING MULTICORE OPTICAL FIBER TO SINGLE CORE OPTICAL FIBERS USING INTERMEDIATE OPTICAL WAVEGUIDE ARRAY

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/937,659

(22) Filed: Jul. 24, 2020

(65) Prior Publication Data

US 2021/0033802 A1 Feb. 4, 2021

(30) Foreign Application Priority Data

Aug. 2, 2019 (JP) .............................. JP2019-143145

(51) Int. Cl.
  *G02B 6/38* (2006.01)
  *G02B 6/30* (2006.01)
  *G02B 6/02* (2006.01)

(52) U.S. Cl.
  CPC .............. *G02B 6/3885* (2013.01); *G02B 6/30* (2013.01); *G02B 6/3818* (2013.01);
  (Continued)

(58) Field of Classification Search
  None
  See application file for complete search history.

(56) References Cited

U.S. PATENT DOCUMENTS

| | | | | |
|---|---|---|---|---|
| 5,414,786 A | * | 5/1995 | Ohta | G02B 6/30 385/129 |
| 6,049,646 A | * | 4/2000 | Boscher | G02B 6/02042 385/137 |

(Continued)

FOREIGN PATENT DOCUMENTS

| | | | |
|---|---|---|---|
| JP | 10-123354 A | * | 5/1998 |
| JP | 2013-76893 A | * | 4/2013 |
| JP | 2018-124307 A | * | 8/2018 |

OTHER PUBLICATIONS

Ono et al.; "PLC Products for FTTH Systems"; Furukawa Review; 2004; No. 26; pp. 6-11.

(Continued)

*Primary Examiner* — Michael Stahl
(74) *Attorney, Agent, or Firm* — Oliff PLC

(57) ABSTRACT

An optical connector includes: an optical waveguide substrate including a plurality of core regions and a cladding layer covering the plurality of core regions; a first ferrule including a first housing portion that houses the optical waveguide substrate; a second ferrule facing the first ferrule and including a second housing portion that houses a multi-core optical fiber including a plurality of first cores and a first cladding covering the plurality of first cores; and a first positioning mechanism configured to determine a position of the second ferrule with respect to the first ferrule and fix the first ferrule and the second ferrule to each other such that the first ferrule and the second ferrule are separable from each other. The second ferrule is disposed such that each of the plurality of core regions is optically connected to a corresponding one of the plurality of first cores via a gap.

10 Claims, 9 Drawing Sheets

(52) U.S. Cl.
CPC ......... *G02B 6/3874* (2013.01); *G02B 6/3882* (2013.01); *G02B 6/02042* (2013.01)

(56) References Cited

U.S. PATENT DOCUMENTS

| | | | |
|---|---|---|---|
| 2010/0178007 A1* | 7/2010 | Thomson | G02B 6/30 385/55 |
| 2010/0195965 A1* | 8/2010 | Sasaoka | G02B 6/02042 385/126 |
| 2012/0328244 A1* | 12/2012 | Sasaki | G02B 6/3885 385/59 |
| 2014/0035175 A1* | 2/2014 | Numata | B29C 33/12 264/1.25 |
| 2019/0346629 A1* | 11/2019 | Morishima | G02B 6/1228 |
| 2020/0379187 A1* | 12/2020 | Matsui | G02B 6/02 |

OTHER PUBLICATIONS

Mitchell et al.; "57 Channel (19×3) Spatial Multiplexer Fabricated Using Direct Laser Inscription"; OFC; 2014; M3K.5.
Seo et al.; "Development of High-Power Stable PLC-Type Pump Combiner"; Furukawa Review; 2003; No. 23; pp. 48-52.

\* cited by examiner

OPTICAL CONNECTOR FOR CONNECTING MULTICORE OPTICAL FIBER TO SINGLE CORE OPTICAL FIBERS USING INTERMEDIATE OPTICAL WAVEGUIDE ARRAY

BACKGROUND OF THE INVENTION

1. Field of the Invention

The present disclosure relates to an optical connector.

2. Description of the Related Art

A technique for optically connecting an optical fiber and an optical waveguide to each other is known. For example, Takahiro Ono et al., PLC Products for FTTH Systems, Furukawa Review, No. 26 (2004), 6-11 (Non Patent Document 1) discloses a planar light circuit (PLC) module. In the PLC module, with the core of an optical fiber and a core region of a PLC being aligned with each other, the optical fiber and the PLC are fixed to each other by an adhesive.

Paul Mitchell et al., 57 Channel (19×3) Spatial Multiplexer Fabricated using Direct Laser Inscription, OFC (2014), M3K.5 (Non Patent Document 2) discloses an optical waveguide that functions as a spatial multiplexer for optically connecting a plurality of single mode fibers (SMFs) and a multi core fiber (MCF) to each other. In the optical waveguide, with SMFs and a core region of an optical waveguide being aligned with each other, a MCF and the core region of the optical waveguide are aligned with each other. Thereafter, with the SMFs being fixed to one end surface of the optical waveguide by an adhesive, the MCF is fixed to the other end surface of the optical waveguide by an adhesive.

Koji Seo et al., Development of High-Power Stable PLC-Type Pump Combiner, Furukawa Review, No. 23 (2003), 48-52 (Non Patent Document 3) discloses a PLC-type pump combiner that has a plurality of optical fibers and a PLC being aligned with each other without using an alignment device. In the pump combiner, a guide pin is inserted into each of a guide hole disposed in a ferrule that holds the PLC and a guide hole disposed in a ferrule that holds the optical fibers, and the PLC and the optical fibers are thereby aligned with each other. Thereafter, to fill a gap between a core region of the PLC and the core of each optical fiber, the two ferrules are held between a clip to thereby cause an end surface of the core region of the PLC and an end surface of the core of each optical fiber to be in physical contact with each other.

SUMMARY OF THE INVENTION

An object of the present disclosure is to provide an optical connector that connects a MCF and a plurality of SMFs to each other and that is capable of improving mass productivity and economic efficiency.

An optical connector according to the present disclosure includes an optical waveguide substrate having a plurality of high-refractive-index regions and a low-refractive-index region that has a refractive index smaller than the refractive index of the plurality of high-refractive-index regions and that covers the plurality of high-refractive-index regions; a first ferrule including a first housing portion that houses the optical waveguide substrate; a second ferrule facing the first ferrule and including a second housing portion configured to house a multi-core optical fiber that includes a plurality of first cores and a first cladding that has a refractive index smaller than the refractive index of the plurality of first cores and that covers the plurality of first cores; and a first positioning mechanism configured to determine a position of the second ferrule with respect to the first ferrule and fix the first ferrule and the second ferrule to each other in a state of being separable from each other.

The optical waveguide substrate has a first end surface facing the multi-core optical fiber and a second end surface positioned opposite to the first end surface. A space between, of the plurality of high-refractive-index regions in the first end surface, mutually adjacent high-refractive-index regions is narrower than a space between, of the plurality of high-refractive-index regions in the second end surface, mutually adjacent high-refractive-index regions. The second ferrule is disposed such that each of the plurality of high-refractive-index regions is optically connected to a corresponding one of the plurality of first cores via a gap.

The present disclosure provides an optical connector that connects a MCF and a plurality of SMFs to each other and that is capable of improving mass productivity and economic efficiency.

DESCRIPTION OF THE PREFERRED EMBODIMENTS

Figure 1:
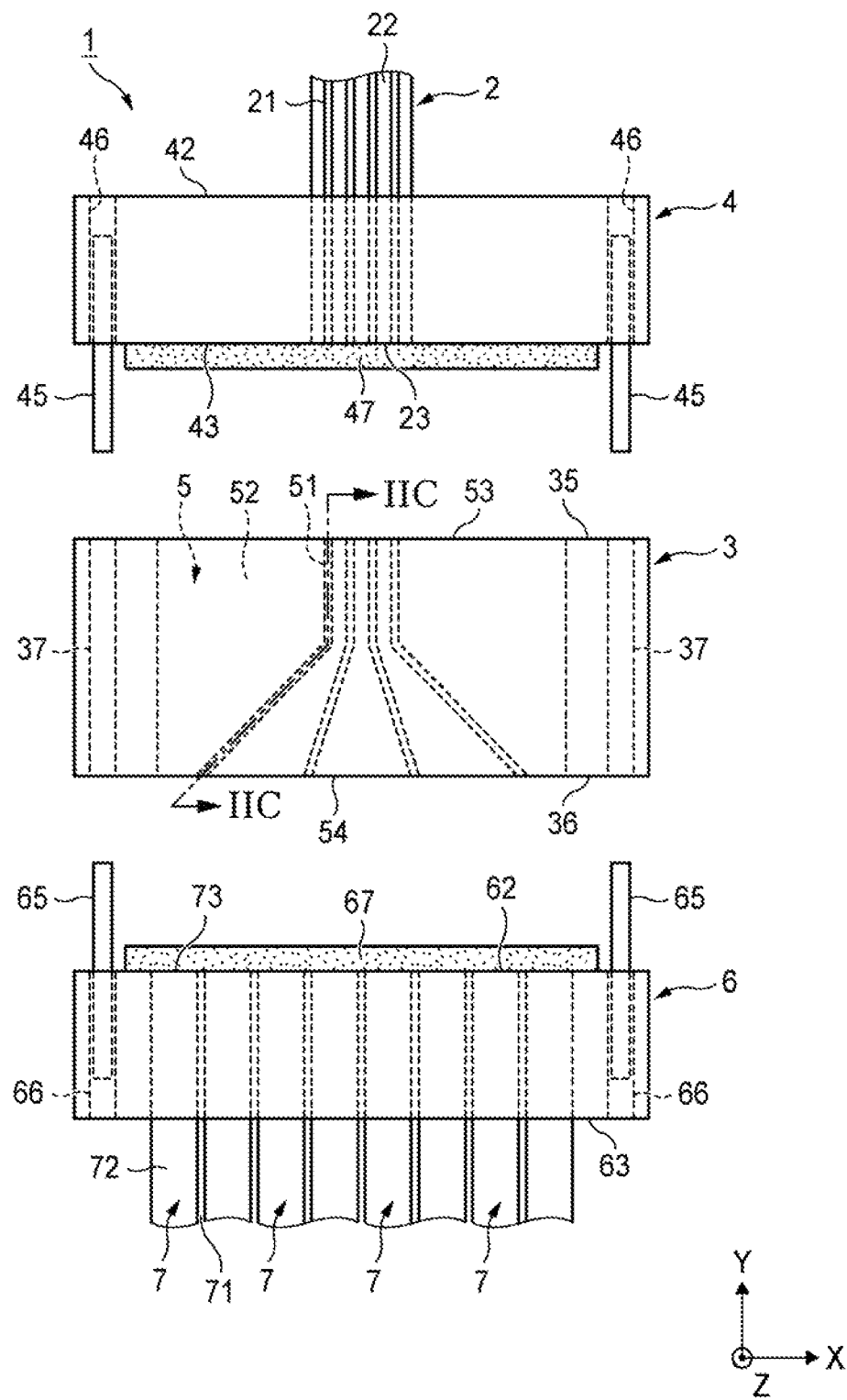
FIG. 1 is a schematic view of an optical connector according to a first embodiment in a state before a second ferrule and a third ferrule are fixed to a first ferrule.

An optical connector according to the present disclosure includes an optical waveguide substrate having a plurality of high-refractive-index regions and a low-refractive-index region having a refractive index smaller than the refractive index of the plurality of high-refractive-index regions and covering the plurality of high-refractive-index regions; a first ferrule including a first housing portion that houses the optical waveguide substrate; a second ferrule facing the first ferrule and including a second housing portion configured to house a multi-core optical fiber that includes a plurality of first cores and a first cladding that has a refractive index smaller than the refractive index of the plurality of first cores and that covers the plurality of first cores; and a first positioning mechanism configured to determine a position of the second ferrule with respect to the first ferrule and fix the first ferrule and the second ferrule to each other so as to be separable from each other.

The optical waveguide substrate has a first end surface facing the multi-core optical fiber and a second end surface positioned opposite to the first end surface. A space between, of the plurality of high-refractive-index regions in the first end surface, mutually adjacent high-refractive-index regions is narrower than a space between, of the plurality of high-refractive-index regions in the second end surface, mutually adjacent high-refractive-index regions. The second ferrule is disposed such that each of the plurality of high-refractive-index regions is optically connected to a corresponding one of the plurality of first cores via a gap.

The optical connector according to the present disclosure may further include a first spacer disposed between the first ferrule and the second ferrule and configured to form a gap between a plurality of high-refractive-index regions and a plurality of first cores. In this case, the first spacer may include a first upper spacer and a first lower spacer facing the first upper spacer with a second housing portion interposed therebetween. Alternatively, in the optical connector according to the present disclosure, a distance between an end surface of a multi-core optical fiber and a first end surface of the optical waveguide substrate may be larger than a distance between an end surface of the second ferrule and the first end surface of the optical waveguide substrate.

In the optical connector according to the present disclosure, the first positioning mechanism may include a first guide hole disposed in the first ferrule, a second guide hole disposed in the second ferrule, and a first guide pin that is inserted into the first guide hole and the second guide hole. Alternatively, the first positioning mechanism may include a sleeve attached to the first ferrule and configured to house the second ferrule, and the inner diameter of the sleeve may be smaller than the outer diameter of the second ferrule.

The optical connector according to the present disclosure may further include a third ferrule that includes a plurality of third housing portions and that faces the first ferrule, and a second positioning mechanism that is configured to determine a position of the third ferrule with respect to the first ferrule and fix the first ferrule and the third ferrule to each other such that the first ferrule and the third ferrule are separable from each other. Each of the plurality of third housing portions may be configured to house a corresponding one of a plurality of single-core optical fibers each having a second core and a second cladding that covers the second core. The third ferrule may be disposed such that each of the plurality of high-refractive-index regions is optically connected to a corresponding one of a plurality of the second cores via a gap. Each of the plurality of second cores may be optically connected to a corresponding one of the plurality of first cores via the optical waveguide substrate.

The optical connector according to the present disclosure may further include a second spacer disposed between the first ferrule and the third ferrule and configured to form a gap between the plurality of high-refractive-index regions and the plurality of second cores. In the optical connector according to the present disclosure, the second positioning mechanism may include a first guide hole disposed in the first ferrule, a third guide hole disposed in the third ferrule, and a second guide pin that is inserted into the first guide hole and the third guide hole.

In the optical connector according to the present disclosure, at least one of the first end surface and the second end surface of the optical waveguide substrate may be inclined with respect to an upper surface of the optical waveguide substrate.

Hereinafter, an embodiment of the present disclosure will be described with reference to the drawings. Note that description of members having the same reference numbers as the reference numbers of members previously described in the description of the present disclosure is omitted to simplify description. In addition, for convenience of description, there is a case in which dimensions of each member illustrated in the drawings differ from the actual dimensions of the member.

The techniques disclosed in Non Patent Document 1 and Non Patent Document 2 require using an alignment device to precisely align an optical fiber and an optical waveguide with each other. Thus, there remains a problem from the point of view of mass productivity. The optical fiber and the optical waveguide are fixed to each other by an adhesive. The optical waveguide and the optical fiber are thus not separable from each other. Therefore, a malfunction of one of the optical waveguide and the optical fiber requires replacement of the entire optical device that includes the optical waveguide and the optical fiber. Thus, there remains a problem from the point of view of economic efficiency of the optical device.

To cause an end surface of a core region of a planar light circuit (PLC) and an end surface of the core of an optical fiber to be in physical contact with each other, the technique disclosed in Non Patent Document 3 requires polishing the end surface of the PLC and the end surface of the optical fiber with high accuracy. Additionally, it is necessary to apply a strong pressing force to the contact surface between the two ferrules by using a clip or the like. Therefore, there remains a problem from the point of view of mass productivity.

First Embodiment

FIG. 1 is a schematic view of an optical connector 1 in a state before a second ferrule 4 and a third ferrule 6 are fixed to a first ferrule 3. The optical connector 1 includes the first ferrule 3, an optical waveguide substrate 5, the second ferrule 4, a first spacer 47, the third ferrule 6, and a second spacer 67.

Figure 2A:
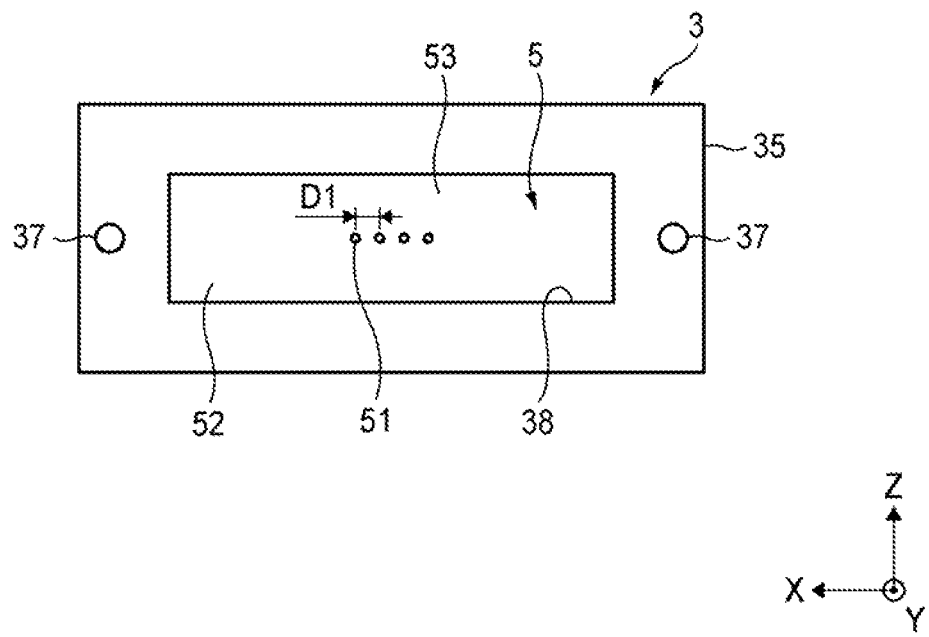
FIG. 2A is an illustration of an end surface of the first ferrule on a side facing the second ferrule in the optical connector according to the first embodiment.
Figure 2B:
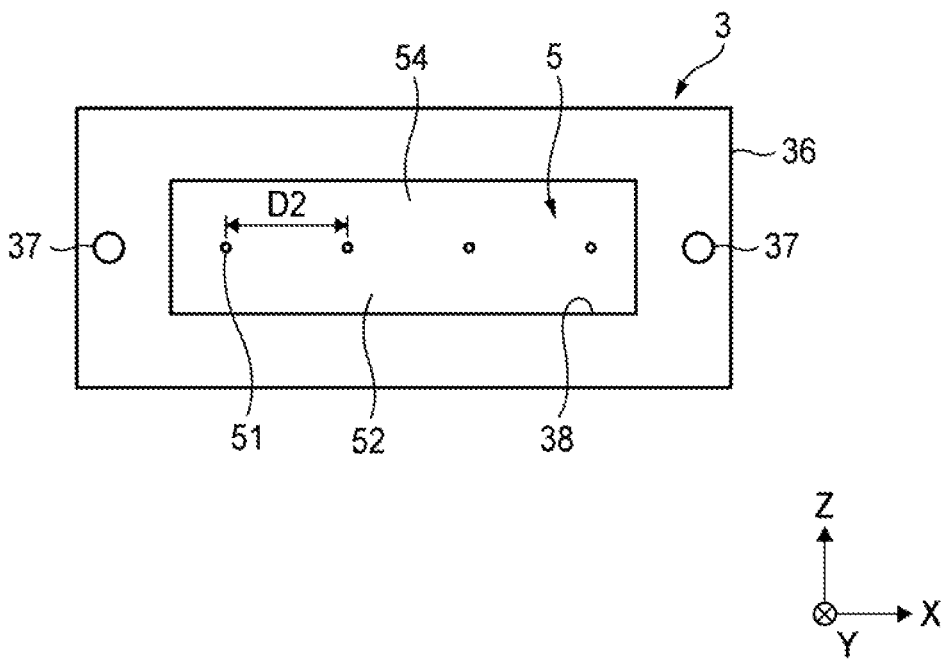
FIG. 2B is an illustration of an end surface of the first ferrule on a side facing the third ferrule in the optical connector according to the first embodiment.

FIG. 2A is an illustration of a first end surface 35 of the first ferrule 3, the first end surface 35 facing the second ferrule 4. FIG. 2B is an illustration of a second end surface 36 of the first ferrule 3, the second end surface 36 being positioned opposite to the first end surface 35 and facing the third ferrule 6. The first ferrule 3 has the first end surface 35 and the second end surface 36. The first ferrule 3 further includes a first housing portion 38 and a pair of first guide holes 37.

Hereinafter, description will be provided by using an X-axis in a direction of a straight line that connects the pair of first guide holes 37 to each other, a Y-axis in an extending direction of the pair of first guide holes 37, and a Z-axis orthogonal to the X-axis and the Y-axis. The first housing portion 38 is a hollow housing portion extending between the first end surface 35 and the second end surface 36 in the Y-axis direction and houses the optical waveguide substrate 5. As a result of the optical waveguide substrate 5 being housed in the first housing portion 38, positioning of the optical waveguide substrate 5 with respect to the first ferrule 3 is completed. The pair of first guide holes 37 extend between the first end surface 35 and the second end surface 36 in the Y-axis direction.

The optical waveguide substrate 5 is a planar light circuit (PLC) and includes four core regions 51 (an example of a high-refractive-index region) extending in the Y-axis direction and a cladding layer 52 (an example of a low-refractive-index region) covering the four core regions 51. The optical waveguide substrate 5 further has a first end surface 53 facing a multi-core optical fiber 2, and a second end surface 54 positioned opposite to the first end surface 53 and facing single-core optical fibers 7. Each of the core regions 51 functions as an optical path along which light propagates. The refractive index of each of the core regions 51 is greater than the refractive index of the cladding layer 52. Each of the core regions 51 may allow only a single mode as a transverse mode.

The four core regions 51 are arranged in the X-axis direction with a space D between mutually adjacent core regions 51 increasing from the first end surface 53 toward the second end surface 54. The four core regions are disposed in the optical waveguide substrate 5 such that a space D1 between the mutually adjacent core regions 51 in the first end surface 53 is narrower than a space D2 between the mutually adjacent core regions 51 in the second end surface 54.

Figure 2C:
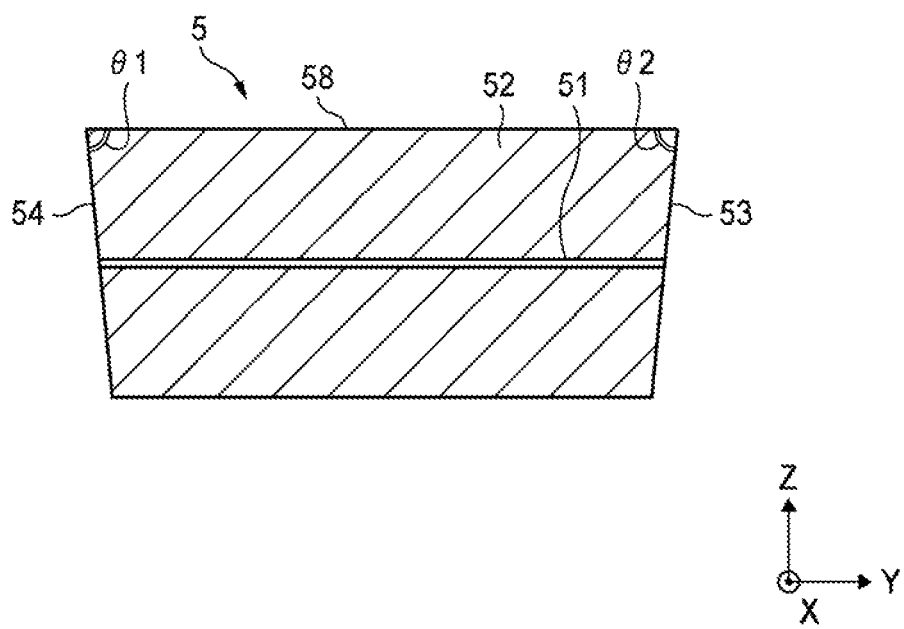
FIG. 2C is a schematic sectional view of an optical waveguide substrate taken along line IIC-IIC indicated in FIG. 1.

FIG. 2C is a schematic sectional view of the optical waveguide substrate 5 taken along line IIC-IIC indicated in FIG. 1. The first end surface 53 of the optical waveguide substrate 5 is a surface inclined with respect to an upper surface 58 of the optical waveguide substrate 5. Similarly, the second end surface 54 of the optical waveguide substrate 5 is a surface inclined with respect to the upper surface 58. For example, as a result of the first end surface 53 and the second end surface 54 being polished, these end surfaces are formed to be inclined surfaces. An angle θ2 between the first end surface 53 and the upper surface 58 is, for example, 82°. An angle θ1 between the second end surface 54 and the upper surface 58 is, for example, 82°.

Due to the first end surface 53 and the second end surface 54 of the optical waveguide substrate thus being inclined surfaces, it is possible to suppress reflection return light generated by the first end surface 53 and the second end surface 54 of each core region. Consequently, it is possible to provide the optical connector 1 capable of suppressing reflection return light generated at the connection portion between the multi-core optical fiber 2 and the single-core optical fibers 7.

In the first embodiment, both the first end surface 53 and the second end surface 54 are inclined surfaces; however, only one of the first end surface 53 and the second end surface 54 may be an inclined surface. As an alternative to at least one of the first end surface 53 and the second end surface 54 being an inclined surface, at least one of the first end surface 53 and the second end surface 54 may have AR (antireflection) coating. In this case, it is similarly possible to suppress reflection return light generated by both end surfaces of each of the core regions 51.

Figure 3A:
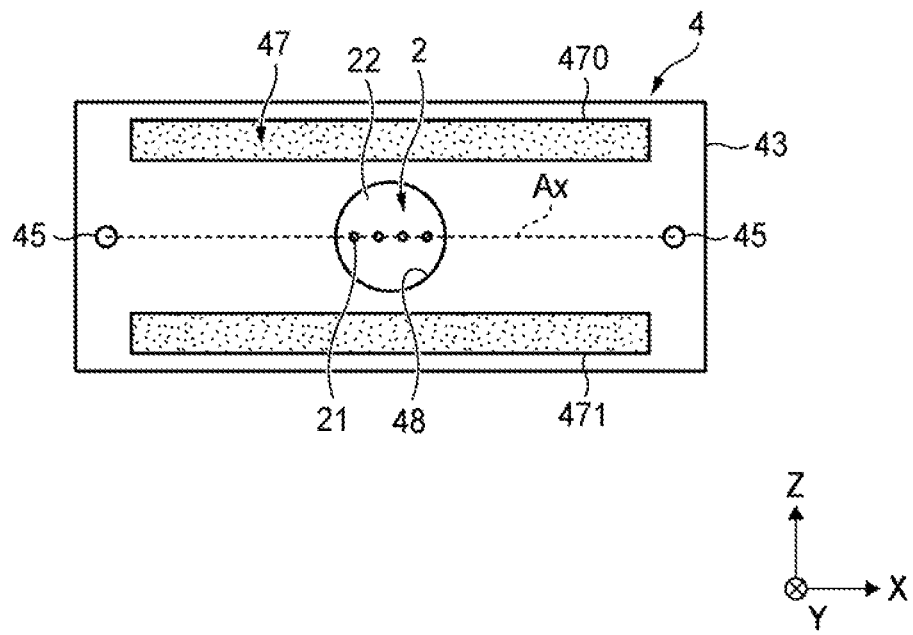
FIG. 3A is an illustration of an end surface of the second ferrule on a side facing the first ferrule in the optical connector according to the first embodiment.

FIG. 3A is an illustration of an end surface 43 of the second ferrule 4 facing the first ferrule 3. The second ferrule 4 has the end surface 43 and an end surface 42 positioned opposite to the end surface 43. The second ferrule 4 further includes a second housing portion 48 and a pair of second guide holes 46. The first ferrule 3 and the second ferrule 4 are positioned by a pair of first guide pins 45.

The second housing portion 48 is a hollow housing portion extending between the end surface 43 and the end surface 42 in the Y-axis direction and houses the multi-core optical fiber 2. As a result of the multi-core optical fiber 2 being housed in the second housing portion 48, positioning of the multi-core optical fiber 2 with respect to the second ferrule 4 is completed. The pair of second guide holes 46 extend between the end surface 42 and the end surface 43 in the Y-axis direction. Each of the pair of first guide pins 45 is fixed to the second ferrule 4 by an adhesive in a state of being inserted into a corresponding one of the pair of second guide holes 46. For example, the diameter of each first guide pin 45 may be slightly (for example, in the range of 3 μm to 5 μm) smaller than the diameter of each first guide hole 37.

The multi-core optical fiber 2 includes four first cores 21 extending in the Y-axis direction and a first cladding 22 covering the four first cores 21. Each of the first cores 21 functions as an optical path along which light propagates. The refractive index of each first core 21 is greater than the refractive index of the first cladding 22. Each of the first cores 21 may allow only a single mode as a transverse mode. The four first cores 21 are arranged in the X-axis direction. In the first embodiment, an end surface 23 of the multi-core optical fiber 2 is flush with the end surface 43 of the second ferrule 4.

In the first embodiment, the rotation position of the multi-core optical fiber 2 is adjusted such that, in a state in which the multi-core optical fiber 2 is inserted into the second housing portion 48, the arrangement direction of the four first cores 21 is parallel to a center line Ax passing through the center of the pair of first guide pins 45. In this case, on the basis of image data indicating the end surface 43 of the second ferrule 4 obtained by a camera or the like, the alignment device (not illustrated) may automatically adjust the rotation position of the multi-core optical fiber 2 such that the arrangement direction of the first cores 21 is parallel to the center line Ax.

A GRIN lens may be disposed on the tip of each first core 21. The GRIN lens is capable of condensing the light output from the core regions 51 toward the first cores 21 and converting the divergent light output from the first cores 21 into parallel light. In order to reduce the reflection return light generated at the end surface of each first core 21, the end surface of each first core 21 may be an inclined surface. The end surfaces of the first cores 21 may have AR coating.

The first spacer 47 includes a first upper spacer 470 and a first lower spacer 471. The first upper spacer 470 and the first lower spacer 471 are disposed on the end surface 43 of the second ferrule 4. The first upper spacer 470 and the first lower spacer 471 may be, for example, resin tapes.

The film thickness of each of the first upper spacer 470 and the first lower spacer 471 may be, for example, 10 μm or less. In the first embodiment, due to the first spacer 47 being disposed between the first ferrule 3 and the second ferrule 4, a gap is formed between the core regions 51 and the first cores 21 in a state (FIG. 4) in which the first ferrule 3 and the second ferrule 4 are fixed to each other. In particular, in a state in which the first ferrule 3 and the second ferrule 4 are fixed to each other by the pair of first guide pins 45, the gap between the core regions 51 and the first cores 21 is defined by the film thickness of the first spacer 47.

The first upper spacer 470 is disposed to face the first lower spacer 471 with the second housing portion 48 interposed therebetween. In this point, the first upper spacer 470 and the first lower spacer 471 may be disposed symmetrically with respect to the center line Ax. Since the first upper spacer 470 and the first lower spacer 471 thus face each other with the second housing portion 48, in which the multi-core optical fiber is housed, interposed therebetween, it is possible to disposed the core regions 51, which are high-refractive-index regions of the optical waveguide substrate, and the first cores 21 of the multi-core optical fiber so as to be parallel to each other. It is thus possible to suppress a coupling loss between the core regions 51 and the first cores 21.

Figure 3B:
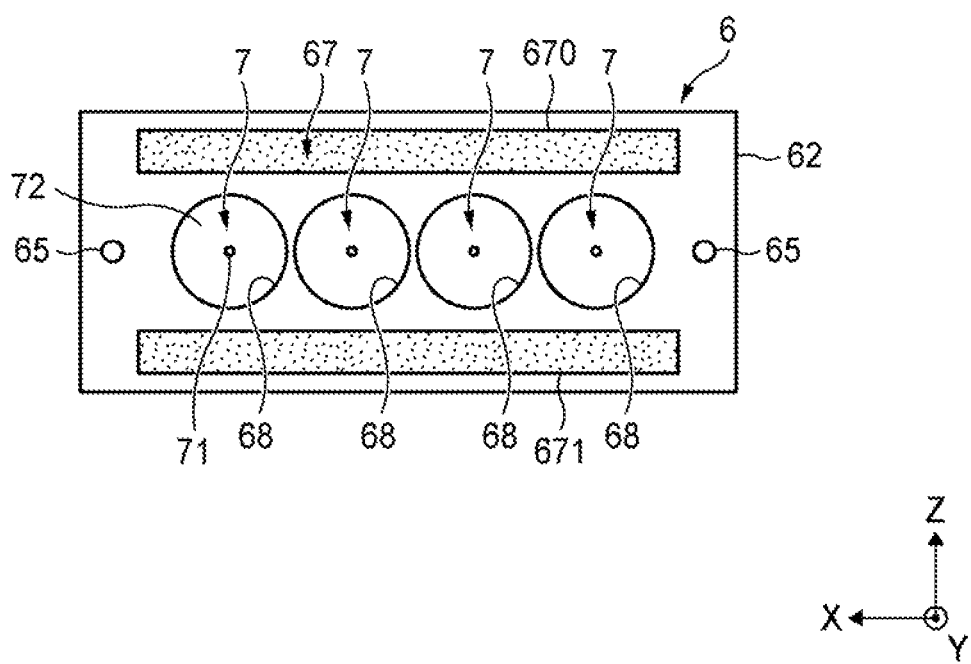
FIG. 3B is an illustration of an end surface of the third ferrule on a side facing the first ferrule in the optical connector according to the first embodiment.

FIG. 3B is an illustration of an end surface of the third ferrule 6 facing the first ferrule 3. The third ferrule 6 has an end surface 62 and an end surface 63 positioned opposite to the end surface 62. The third ferrule 6 further includes four third housing portions 68 and a pair of third guide holes 66. The first ferrule 3 and the third ferrule 6 are positioned by a pair of second guide pins 65.

Each of the third housing portions 68 is a hollow housing portion extending between the end surface 62 and the end surface 63 in the Y-axis direction and is configured to house a corresponding one of the four single-core optical fibers 7. As a result of each of the single-core optical fibers 7 being housed in the third housing portion 68 corresponding thereto, positioning of each single-core optical fiber 7 with respect to the third ferrule 6 is completed. The four third housing portions 68 are arranged in the X-axis direction, and thus, the four single-core optical fibers 7 are also arranged in the X-axis direction. The pair of third guide holes 66 extend between the end surface 62 and the end surface 63 in the Y-axis direction. Each of the pair of second guide pins 65 is fixed to the third ferrule 6 by an adhesive in a state of being inserted into a corresponding one of the pair of third guide holes 66. For example, the diameter of each second guide pin 65 may be slightly (for example, in the range of 3 µm to 5 µm) smaller than the diameter of each first guide hole 37.

Each of the single-core optical fibers 7 includes a single second core 71 extending in the Y-axis direction and a second cladding 72 covering the second core 71. The second core 71 functions as an optical path along which light propagates. The refractive index of the second core 71 is greater than the refractive index of the second cladding 72. The second core 71 may allow only a single mode as a transverse mode. In the first embodiment, an end surface 73 of each single-core optical fiber 7 is flush with the end surface 62 of the third ferrule 6.

A GRIN lens may be disposed on the tip of each second core 71. The GRIN lens is capable of condensing the light emitted from the core regions 51 toward the second cores 71 and converting the divergent light emitted from the second cores 71 into parallel light. In order to reduce the reflection return light generated by the end surface of each second core 71, the end surface of each second core 71 may be an inclined surface, or each second core 71 may have AR coating.

The second spacer 67 includes a second upper spacer 670 and a second lower spacer 671. The second upper spacer 670 and the second lower spacer 671 are disposed on the end surface 62 of the third ferrule 6. The second upper spacer 670 and the second lower spacer 671 may be, for example, resin tapes.

The film thickness of each of the second upper spacer 670 and the second lower spacer 671 may be, for example, 10 µm or less. In the first embodiment, the second spacer 67 is disposed between the first ferrule 3 and the third ferrule 6. Therefore, in a state (FIG. 4) in which the first ferrule 3 and the third ferrule 6 are fixed to each other, a gap is formed between the core regions 51 and the second cores 71. In particular, in a state in which the first ferrule 3 and the third ferrule 6 are fixed to each other by the pair of second guide pins 65, the gap between the core regions 51 and the first cores 21 is defined by the film thickness of the second spacer 67.

The second upper spacer 670 is disposed to face the second lower spacer 671 with the four third housing portions 68 interposed therebetween. In this point, the second upper spacer 670 and the second lower spacer 671 may be disposed symmetrically with respect to a center line passing through the center of the third ferrule 6 in the Z-axis direction. Since the second upper spacer 670 and the second lower spacer 671 thus face each other with the four third housing portions 68 interposed therebetween, it is possible to dispose the core regions 51 and the second cores 71 so as to be parallel to each other. It is thus possible to suppress a coupling loss between the core regions 51 and the second cores 71.

Figure 4:
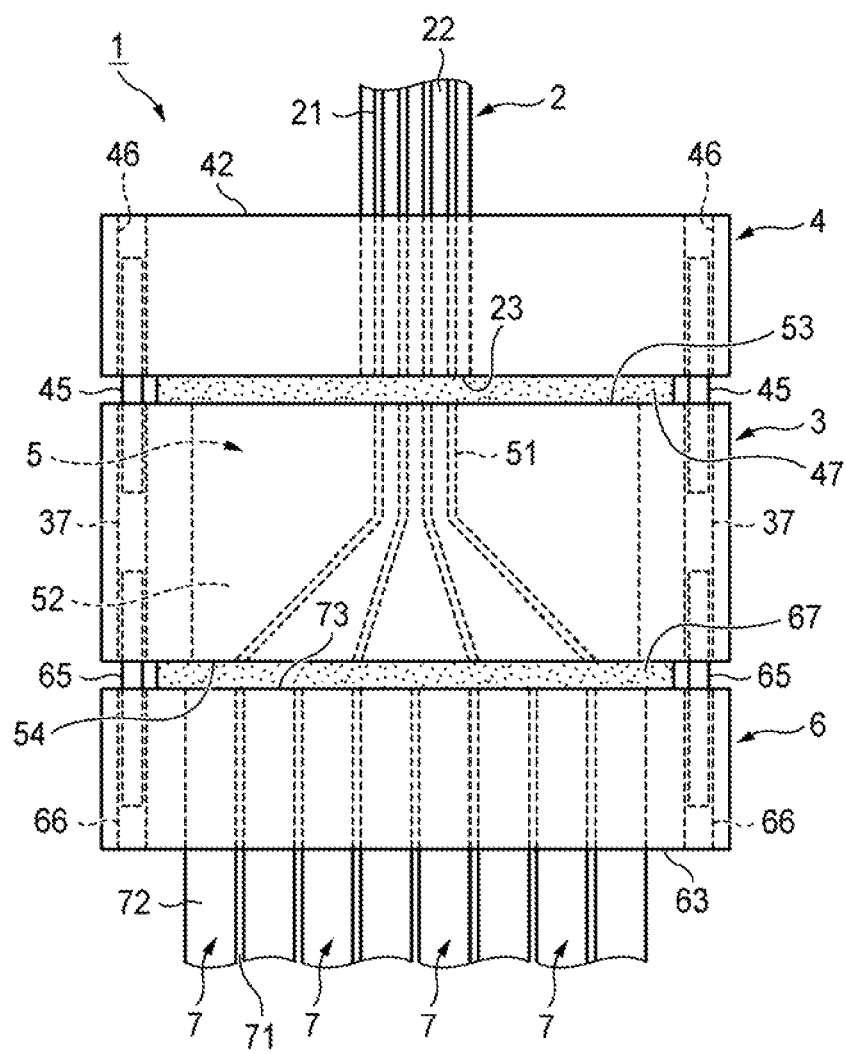
FIG. 4 is a schematic view of the optical connector according to the first embodiment in a state in which the second ferrule and the third ferrule are fixed to the first ferrule.
Figure 4:
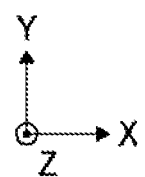

FIG. 4 is a schematic view of the optical connector 1 according to the first embodiment in a state in which the second ferrule 4 is fixed to the first ferrule 3 and in which the third ferrule 6 is fixed to the first ferrule 3. As a result of each of the pair of first guide pins 45 being inserted into the first guide holes 37 corresponding thereto disposed in the first ferrule 3, the second ferrule 4 is fixed to the first ferrule 3, and the position of the second ferrule 4 with respect to the first ferrule 3 is determined. The positions of the first cores 21 of the multi-core optical fiber 2 with respect to the core regions 51 of the optical waveguide substrate 5 are thus determined. The first guide pins 45 inserted into the first guide holes 37 are not bonded to the first ferrule 3 by an adhesive or the like. In this point, a pressing force may be applied between the first ferrule 3 and the second ferrule 4 and between the first ferrule 3 and the third ferrule 6 by a clip or the like (not illustrated).

In the first embodiment, the pair of first guide holes 37, the pair of second guide holes 46, and the pair of first guide pins 45 function as a first positioning mechanism that determines the position of the second ferrule 4 with respect to the first ferrule 3 and that fixes the first ferrule 3 and the second ferrule 4 to each other such that the first ferrule 3 and the second ferrule 4 are separable from each other. Due to the first spacer 47 being disposed between the first ferrule 3 and the second ferrule 4, a gap is formed between the four core regions 51, which are a plurality of high-refractive-index regions, and a plurality (four in the first embodiment) of the first cores 21. Each of the four core regions 51 is thus optically connected to a corresponding one of the four first cores 21 via a gap formed by the first spacer 47.

According to the first embodiment, it is possible without using an alignment device or the like to position the core regions 51, which are high-refractive-index regions of the optical waveguide substrate 5, and the first cores 21 of the multi-core optical fiber 2, which is a first optical fiber, to each other. It is thus possible to improve mass productivity of the optical connector 1. Even when a malfunction occurs in a portion (for example, the optical waveguide substrate 5) of the optical connector 1, replacement of the entire optical connector 1 is not required. Thus, replacement of only a malfunctioning portion of the optical connector 1 is enabled. Therefore, it is possible to improve economic efficiency of the optical connector 1.

Since each of the four core regions 51, which are a plurality of high-refractive-index regions, is optically connected to a corresponding one of a plurality (four in the first embodiment) of the first cores 21 via a gap, the optical waveguide substrate 5 and the multi-core optical fiber 2 are not required to be in physical contact with each other. Consequently, it is not necessary to apply a strong pressing force to the optical waveguide substrate 5 and the multi-core optical fiber 2. Moreover, it is also not necessary to precisely polish the first end surface 53 of the optical waveguide substrate 5 and the end surface 23 of the multi-core optical fiber 2. It is thus possible to improve mass productivity of the optical connector 1.

As a result of each of the pair of second guide pins 65 being inserted into the first guide holes 37 corresponding thereto, the third ferrule 6 is fixed to the first ferrule 3, and the position of the third ferrule 6 with respect to the first ferrule 3 is determined. The position of the second core 71 of each single-core optical fiber 7 with respect to each core region 51 of the optical waveguide substrate 5 is thus determined. The second guide pins 65 inserted into the first guide holes 37 are not bonded to the first ferrule 3 by an adhesive or the like.

In the first embodiment, the pair of first guide holes 37, the pair of third guide holes 66, and the pair of second guide pins 65 function as a second positioning mechanism configured to determine the position of the third ferrule 6 with respect to the first ferrule 3 and fix the first ferrule 3 and the third ferrule 6 to each other such that the first ferrule 3 and the third ferrule 6 are separable from each other. Due to the second spacer 67 being disposed between the first ferrule 3 and the third ferrule 6, a gap is formed between the four core regions 51, which are a plurality of high-refractive-index regions, and a plurality (four in the present embodiment) of the second cores 71. Each of the four core regions 51 is thus optically connected to a corresponding one of the four second cores 71 via a gap formed by the second spacer 67.

According to the first embodiment, it is possible without using an alignment device or the like to position the high-refractive-index regions (core regions 51) of the optical waveguide substrate 5 and the second core 71 of each single-core optical fiber 7 with each other. It is thus possible to improve mass productivity of the optical connector 1. Even when a malfunction occurs in a portion (for example, the optical waveguide substrate 5) of the optical connector 1, replacement of the entire optical connector 1 is not required. Thus, replacement of only a malfunctioning portion of the optical connector 1 is enabled. Therefore, it is possible to improve economic efficiency of the optical connector 1.

Since each of the core regions 51, which are a plurality (four in the present embodiment) of the high-refractive-index regions, is optically connected to a corresponding one of the four second cores 71 via a gap, the optical waveguide substrate 5 and each single-core optical fiber 7 are not required to be in physical contact with each other. Consequently, it is not necessary to apply a strong pressing force to the optical waveguide substrate 5 and each of the single-core optical fibers 7. Moreover, it is also not necessary to precisely polish the second end surface 54 of the optical waveguide substrate 5 and the end surface 73 of each single-core optical fiber 7. It is thus possible to improve mass productivity of the optical connector 1.

Since each of the four second cores 71 is optically connected to a corresponding one of the four first cores 21 via the optical waveguide substrate 5, it is possible to provide the optical connector 1 capable of optically connecting each of the single-core optical fibers 7 and the multi-core optical fiber 2 to each other.

In the present embodiment, the four single-core optical fibers 7, the four core regions 51, and the multi-core optical fiber 2 that includes the four first cores 21 is presented as an example; however, the number of each of them is not limited thereto. For example, when the number of the single-core optical fibers 7 is N (N>1), the number of each of the core regions 51 and the first cores 21 is also N.

The first guide pins 45 may be fixed to the first ferrule 3 via an adhesive in a state of being inserted into the first guide holes 37 of the first ferrule 3. Similarly, the second guide pins 65 also may be fixed to the first ferrule 3 via an adhesive in a state of being inserted into the first guide holes 37. In this case, when the second ferrule 4 is positioned and fixed with respect to the first ferrule 3, each of the pair of first guide pins 45 is not fixed to a corresponding one of the pair of second guide holes 46. When the third ferrule 6 is positioned and fixed with respect to the first ferrule 3, each of the pair of second guide pins 65 is not fixed to a corresponding one of the pair of third guide holes 66. The first spacer 47 may be disposed on the first end surface 35 of the first ferrule 3. Similarly, the second spacer 67 may be disposed on the second end surface 36 of the first ferrule 3.

Modification

Figure 5:
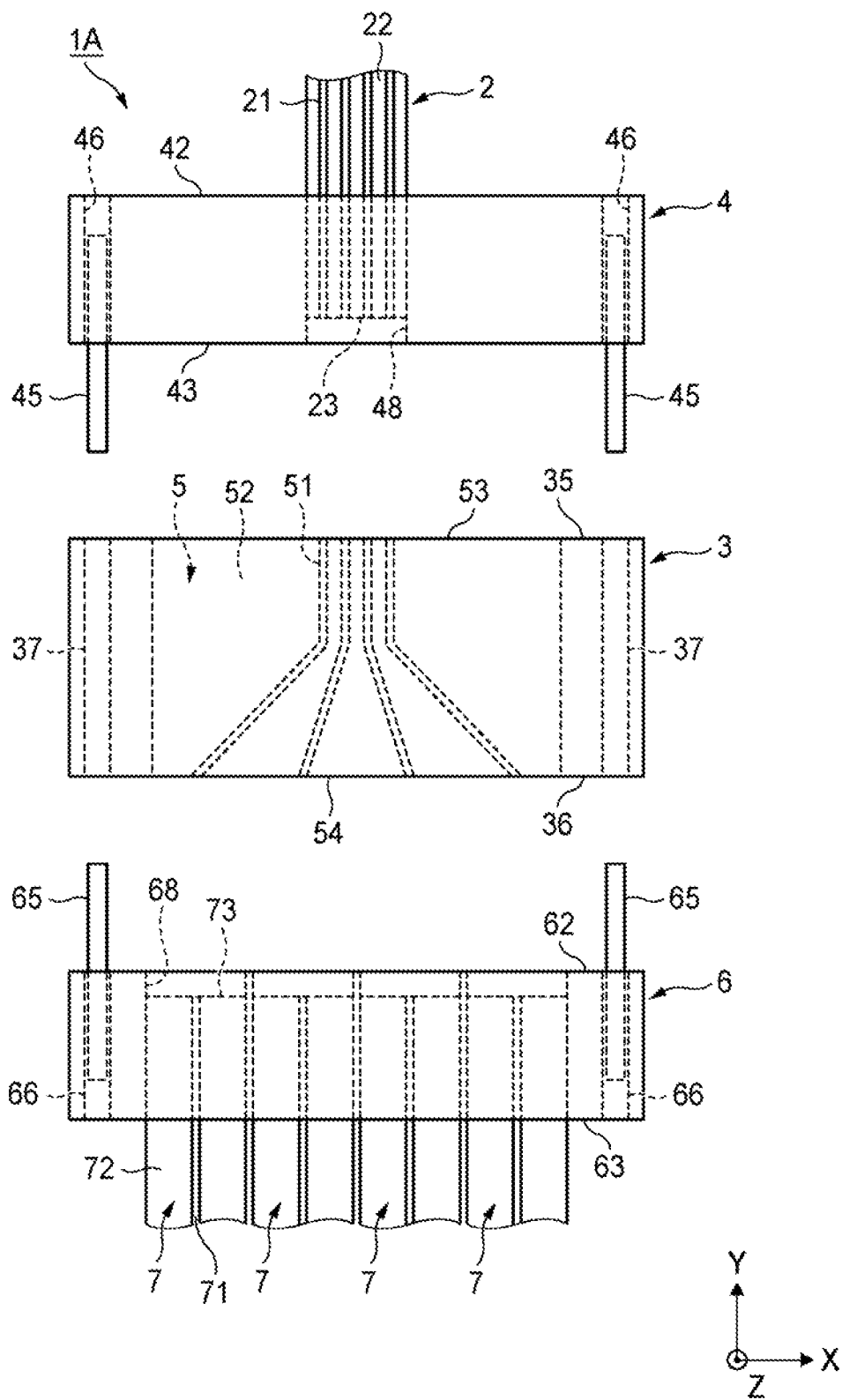
FIG. 5 is a schematic view of an optical connector according to a modification of the first embodiment in a state before the second ferrule and the third ferrule are fixed to the first ferrule.

FIG. 5 is a schematic view of an optical connector 1A according to a modification of the first embodiment in a state before the second ferrule 4 and the third ferrule 6 are fixed to the first ferrule 3. In the following description, repeated description of components having the same reference numbers as those of components already described in the first embodiment will not be provided.

The optical connector 1A differs from the optical connector 1 of the first embodiment in that no spacer is disposed on the end surfaces of the second ferrule 4 and the third ferrule 6. That is, according to the optical connector 1A, instead of the first spacer 47 disposed on the end surface 43 of the second ferrule 4 of the first embodiment, the position of the end surface 23 of the multi-core optical fiber 2 is retracted from the position of the end surface 43 of the second ferrule 4. In other words, a distance between the end surface 23 of the multi-core optical fiber 2 and the first end surface 53 of the optical waveguide substrate 5 in the Y-axis direction is larger than a distance between the end surface 43 and the first end surface 53 in the Y-axis direction. Since it is possible to thus form, without disposing the first spacer 47, a gap between the core regions 51, which are high-refractive-index regions of the optical waveguide substrate 5, and the first cores 21 of the multi-core optical fiber 2, it is possible to reduce the number of parts of the optical connector 1A.

Instead of the second spacer 67 disposed on the end surface 62 of the third ferrule 6 in the first embodiment, the position of the end surface 73 of each single-core optical fiber 7 is retracted from the position of the end surface 62 of the third ferrule 6. In other words, a distance between the end surface 73 of each single-core optical fiber 7 and the second end surface 54 of the optical waveguide substrate 5 in the Y-axis direction is larger than a distance between the end surface 62 and the second end surface 54 in the Y-axis direction. Since it is possible to thus form, without disposing the second spacer 67, a gap between the core regions 51 of the optical waveguide substrate 5 and the second cores 71 of the single-core optical fibers 7, it is possible to reduce the number of parts of the optical connector 1A.

Second Embodiment

Figure 6:
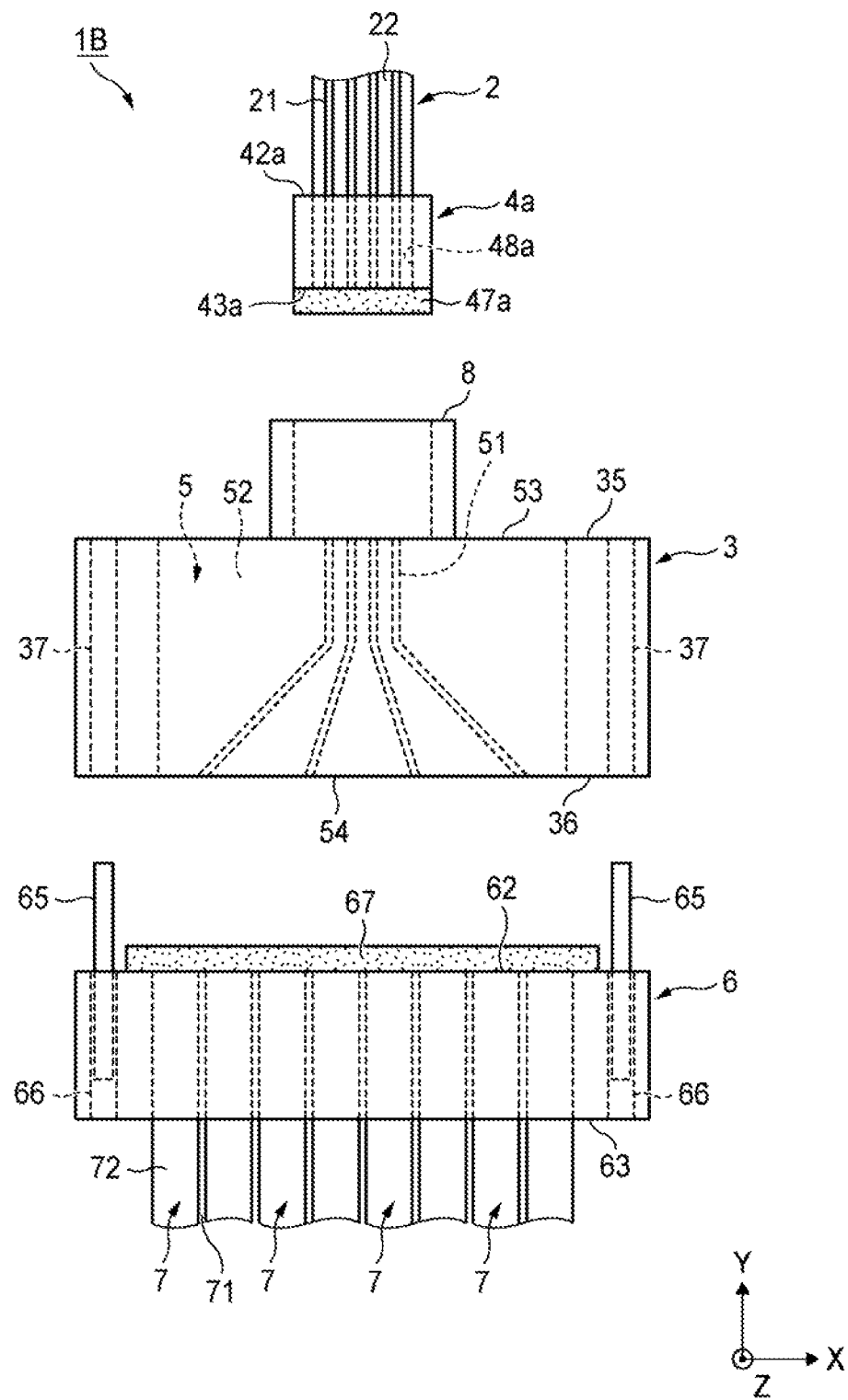
FIG. 6 is a schematic view of an optical connector according to a second embodiment in a state before the second ferrule and the third ferrule are fixed to the first ferrule.

FIG. 6 is a schematic view of an optical connector 1B according to a second embodiment in a state before a second ferrule 4a and the third ferrule 6 are fixed to the first ferrule 3. The optical connector 1B greatly differs from the optical connector 1 according to the first embodiment in that, instead of the pair of first guide pins 45 in the first embodiment, a sleeve 8 functions as the first positioning mechanism. In the following description, differences between the optical connector 1 and the optical connector 1B will be mentioned. The optical connector 1B includes the first ferrule 3, the optical waveguide substrate 5, the second ferrule 4a, a first spacer 47a, the sleeve 8, the third ferrule 6, and the second spacer 67.

Figure 7A:
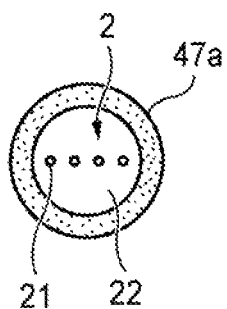
FIG. 7A is an illustration of an end surface of the second ferrule on a side facing the first ferrule in an optical connector according to the second embodiment.
Figure 7A:
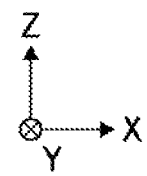

FIG. 7A is an illustration of an end surface of the second ferrule 4a facing the first ferrule 3 in the optical connector 1B according to the second embodiment. The second ferrule 4a has an end surface 43a facing the first ferrule 3 and an end surface 42a positioned opposite to the end surface 43a. The second ferrule 4a further includes a hollow second housing portion 48a extending between the end surface 43a and the end surface 42a in the Y-axis direction. The second housing portion 48a is configured to house the multi-core optical fiber 2. As a result of the multi-core optical fiber 2 being housed in the second housing portion 48a, positioning of the multi-core optical fiber 2 with respect to the second ferrule 4a is completed. In this point, the rotation position of the multi-core optical fiber 2 may be determined by the housing that houses the second ferrule 4a and an adapter that houses the first ferrule 3 being engaged with each other.

The first spacer 47a is disposed on the end surface 43a of the second ferrule 4a to surround the multi-core optical fiber 2. The first spacer 47a may be, for example, a resin tape. The film thickness of the first spacer 47a may be, for example, 10 μm or less. In the second embodiment, the first spacer 47a is disposed between the first ferrule 3 and the second ferrule 4a, and therefore, in a state (refer to FIG. 8) in which the first ferrule 3 and the second ferrule 4a are fixed to each other, a gap is formed between the core regions 51 and the first cores 21. In particular, in a state in which the second ferrule 4a is positioned and fixed with respect to the first ferrule 3 by the sleeve 8, the gap between the core regions 51 and the first cores 21 is defined by the film thickness of the first spacer 47a.

Figure 7B:
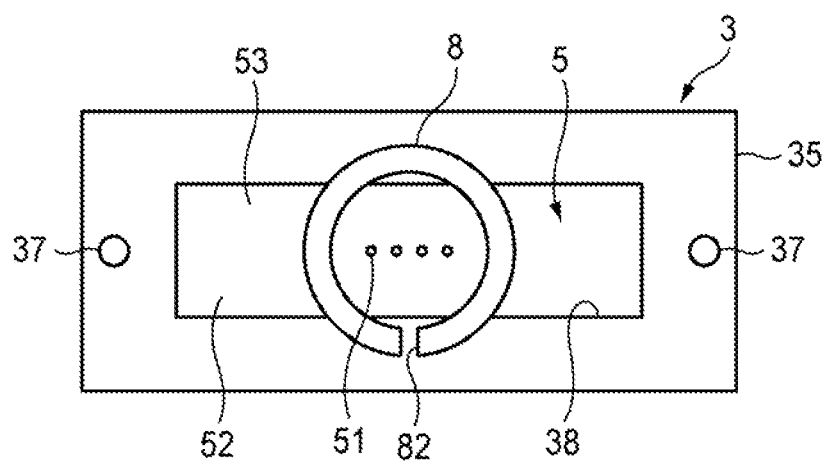
FIG. 7B is an illustration of an end surface of the first ferrule on a side facing the second ferrule in the optical connector according to the second embodiment.
Figure 7B:
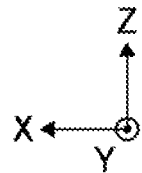

FIG. 7B is an illustration of the first end surface 35 of the first ferrule 3 of the optical connector 1B according to the second embodiment, the first end surface 35 facing the second ferrule 4a. The cylindrical sleeve 8, which functions as the first positioning mechanism, is attached to the first end surface 35 of the first ferrule 3 and configured to house the second ferrule 4a. The sleeve 8 is a split sleeve, and a slit 82 extending in the Y-axis direction is formed in the sleeve 8. The inner diameter of the sleeve 8 is slightly smaller than the outer diameter of the second ferrule 4a.

Figure 8:
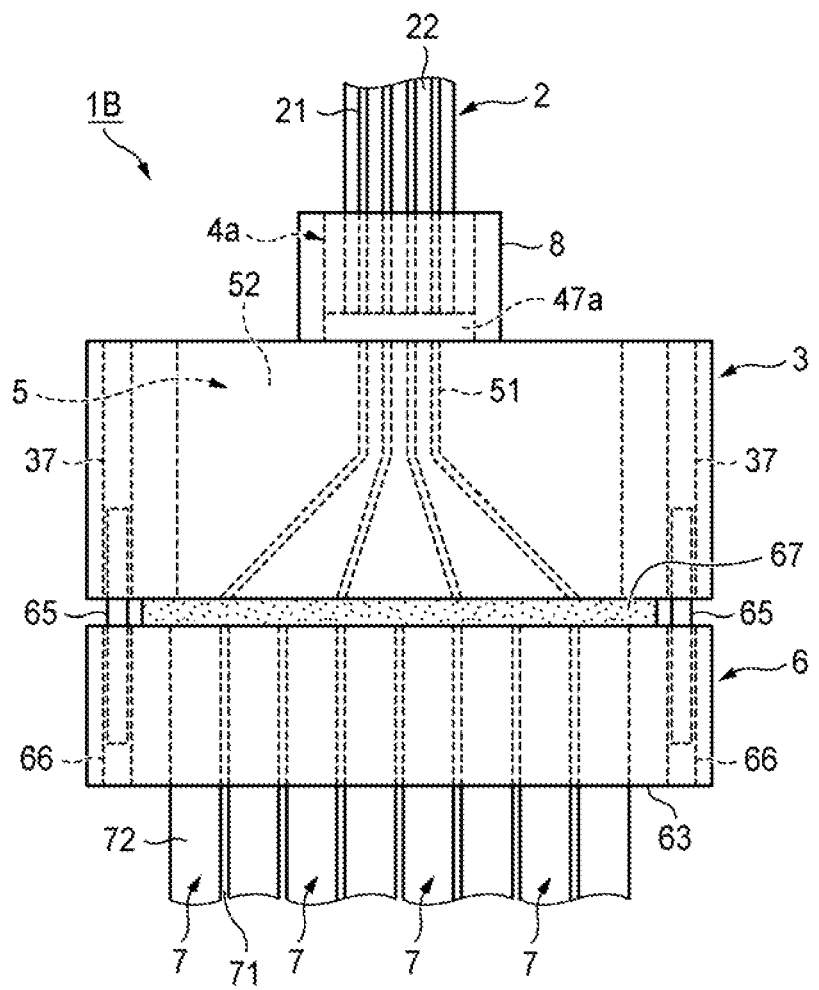
FIG. 8 is a schematic view of the optical connector according to the second embodiment in a state in which the second ferrule and the third ferrule are fixed to the first ferrule.
Figure 8:
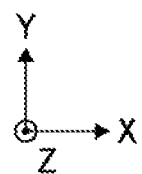

FIG. 8 is a schematic view of the optical connector 1B according to the second embodiment in a state in which the second ferrule 4a and the third ferrule 6 are fixed to the first ferrule 3. As a result of the second ferrule 4a being inserted into the sleeve 8, the second ferrule 4a is fixed to the first ferrule 3, and the position of the second ferrule 4a with respect to the first ferrule 3 is determined. The positions of the first cores 21 of the multi-core optical fiber 2 with respect to the core regions 51 of the optical waveguide substrate 5 are thus determined. The second ferrule 4a is inserted into the sleeve 8 while not being bonded to the first ferrule 3. In this point, a pressing force may be applied between the first ferrule 3 and the second ferrule 4a and between the first ferrule 3 and the third ferrule 6 by a clip or the like (not illustrated).

In the second embodiment, the sleeve 8 functions as the first positioning mechanism configured to determine the position of the second ferrule 4a with respect to the first ferrule 3 and fix the first ferrule 3 and the second ferrule 4a to each other such that the first ferrule 3 and the second ferrule 4a are separable from each other. Due to the first spacer 47a being disposed between the first ferrule 3 and the second ferrule 4a, a gap is formed between the four core regions 51 and the four first cores 21. Each of the four core regions 51 is thus optically connected to a corresponding one of the four first cores 21 via a gap formed by the first spacer 47a.

According to the second embodiment, it is possible without using an alignment device or the like to position the core regions 51 of the optical waveguide substrate 5 and the first cores 21 of the multi-core optical fiber 2 with each other. It is thus possible to improve mass productivity of the optical connector 1B. Even when a malfunction occurs in a portion (for example, the optical waveguide substrate 5) of the optical connector 1B, replacement of the entire optical connector 1B is not required. Thus, replacement of only a malfunctioning portion of the optical connector 1B is enabled. Therefore, it is possible to improve economic efficiency of the optical connector 1B.

Since each of the four core regions 51 is optically connected to a corresponding one of the four first cores 21 via a gap, the optical waveguide substrate 5 and the multi-core optical fiber 2 are not required to be in physical contact with each other. Consequently, it is not necessary to apply a strong pressing force to the optical waveguide substrate 5 and the multi-core optical fiber 2. Moreover, it is also not necessary to precisely polish the first end surface 53 of the optical waveguide substrate 5 and the end surface 23 of the multi-core optical fiber 2. It is thus possible to improve mass productivity of the optical connector 1.

Although embodiments of the present disclosure have been described above, there is no need to say that the technical scope of the present invention should not be interpreted by being limited by the description of the present embodiments. The present embodiments are merely examples, and it is understood by those skilled in the art that various changes of the embodiments are possible within the scope of the invention described in the claims. Accordingly, the technical scope of the present invention should be determined on the basis of the scope of the invention described in the claims and a scope equivalent thereto.

| Reference numerals | | |
| --- | --- | --- |
| 1: optical connector, | 1A: optical connector, | 1B: optical connector, |
| 2: multi-core optical fiber, | 3: first ferrule, | 4: second ferrule, |
| 4a: second ferrule, | 5: optical waveguide substrate, | 6: third ferrule, |
| 7: single-core optical | 8: sleeve, | 21: first core, |

| Reference numerals | | |
| --- | --- | --- |
| fiber, | | |
| 22: first cladding, | 37: first guide hole, | 38: first housing portion, |
| 45: first guide pin, | 46: second guide hole, | 47: first spacer, |
| 47a: first spacer, | 48: second housing portion, | 48a: second housing portion, |
| 51: core region, | 52: cladding layer, | 65: second guide pin, |
| 66: third guide hole, | 67: second spacer, | 68: third housing portion, |
| 71: second core, | 72: second cladding | |

What is claimed is:

1. An optical connector comprising:
    an optical waveguide substrate having a plurality of high-refractive-index regions and a low-refractive-index region that has a refractive index smaller than a refractive index of the plurality of high-refractive-index regions and that covers the plurality of high-refractive-index regions;
    a first ferrule including a first housing portion that houses the optical waveguide substrate;
    a second ferrule facing the first ferrule and including a second housing portion that houses a multi-core optical fiber including a plurality of first cores and a first cladding that has a refractive index smaller than a refractive index of the plurality of first cores and that covers the plurality of first cores; and
    a first positioning mechanism configured to determine a position of the second ferrule with respect to the first ferrule and fix the first ferrule and the second ferrule to each other such that the first ferrule and the second ferrule are separable from each other,
    wherein the optical waveguide substrate has a first end surface facing the multi-core optical fiber and a second end surface positioned opposite to the first end surface,
    wherein a space between, of the plurality of high-refractive-index regions in the first end surface, mutually adjacent high-refractive-index regions is narrower than a space between, of the plurality of high-refractive-index regions in the second end surface, mutually adjacent high-refractive-index regions, and
    wherein the second ferrule is disposed such that each of the plurality of high-refractive-index regions is optically connected to a corresponding one of the plurality of first cores via a gap.

2. The optical connector according to claim 1, further comprising:
    a first spacer disposed between the first ferrule and the second ferrule and configured to form a gap between the plurality of high-refractive-index regions and the plurality of first cores.

3. The optical connector according to claim 2,
    wherein the first spacer includes
        a first upper spacer, and
        a first lower spacer facing the first upper spacer with the second housing portion interposed therebetween.

4. The optical connector according to claim 1,
    wherein a distance between an end surface of the multi-core optical fiber and the first end surface of the optical waveguide substrate is larger than a distance between an end surface of the second ferrule and the first end surface of the optical waveguide substrate.

5. The optical connector according to claim 1,
    wherein the first positioning mechanism includes
        a first guide hole disposed in the first ferrule,
        a second guide hole disposed in the second ferrule, and
        a first guide pin inserted into the first guide hole and the second guide hole.

6. The optical connector according to claim 1,
    wherein the first positioning mechanism includes
        a sleeve attached to the first ferrule and configured to house the second ferrule, and
    wherein an inner diameter of the sleeve is smaller than an outer diameter of the second ferrule.

7. The optical connector according to claim 1, further comprising:
    a third ferrule including a plurality of third housing portions and facing the first ferrule, and
    a second positioning mechanism configured to determine a position of the third ferrule with respect to the first ferrule and fix the first ferrule and the third ferrule to each other such that the first ferrule and the third ferrule are separable from each other,
    wherein each of the plurality of third housing portions is configured to house a corresponding one of a plurality of single-core optical fibers each having a second core and a second cladding covering the second core,
    wherein the third ferrule is disposed such that each of the plurality of high-refractive-index regions is optically connected to a corresponding one of the plurality of second cores via a gap, and
    wherein each of the plurality of second cores is optically connected to a corresponding one of the plurality of first cores via the optical waveguide substrate.

8. The optical connector according to claim 7, further comprising:
    a second spacer that is disposed between the first ferrule and the third ferrule and that is configured to form a gap between the plurality of high-refractive-index regions and the plurality of second cores.

9. The optical connector according to claim 7,
    wherein the second positioning mechanism includes
        a first guide hole disposed in the first ferrule,
        a third guide hole disposed in the third ferrule, and
        a second guide pin inserted into the first guide hole and the third guide hole.

10. The optical connector according to claim 1,
    wherein at least one of the first end surface and the second end surface of the optical waveguide substrate is inclined with respect to an upper surface of the optical waveguide substrate.

* * * * *